United States Patent [19]

Tanaka et al.

[11] 4,068,934
[45] Jan. 17, 1978

[54] AUTOMATIC INFORMATION RETRIEVAL DEVICE

[75] Inventors: Atsuyuki Tanaka; Nobuaki Nishioka, both of Sakai, Japan

[73] Assignee: Minolta Camera Kabushiki Kaisha, Japan

[21] Appl. No.: 639,612

[22] Filed: Dec. 10, 1975

[30] Foreign Application Priority Data

Dec. 16, 1974 Japan .............................. 49-145387
Dec. 16, 1974 Japan .............................. 49-145388
Dec. 16, 1974 Japan .............................. 49-145389

[51] Int. Cl.² ............................................ G03B 23/12
[52] U.S. Cl. .................... 353/26 A; 353/120
[58] Field of Search ............ 242/188; 353/26 A, 120; 250/561, 571

[56] References Cited

U.S. PATENT DOCUMENTS 3,184,177  5/1965  Hannah ............................... 242/188
3,290,987 12/1966  James et al. ...................... 353/26 A
3,678,282  7/1972  Johnson et al. ...................... 250/561
3,708,677  1/1973  Volk et al. .................... 353/26 A X
3,744,890  7/1973  Suzuki et al. ...................... 353/26 A Primary Examiner—George F. Mautz
Attorney, Agent, or Firm—Wenderoth, Lind & Ponack

[57] ABSTRACT

An automatic information retrieval device employing an information-containing film wound on reels housed in a cartridge, which retrieval device is provided with a servo system for driving one of the film reels by a servo-controlled motor and the other of the film reels by a one directional constant torque motor so as to apply proper tension to the film between the reels for rapid and accurate selection of a desired information frame of the film without disengagement of the film ends from the reels. The retrieval device further employs an information film having counting blip-marks, parity check marks and non-light transmitting portion for accurate positioning of the desired frame.

5 Claims, 21 Drawing Figures

FIG. 10.(a) $V_A$

FIG. 10.(b) $V_B$

Figure 10:
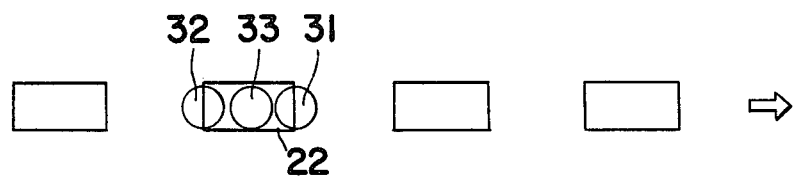
Figure 10:
Figure 10:
Figure 10:
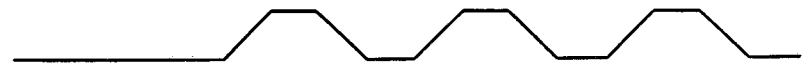
Figure 10:
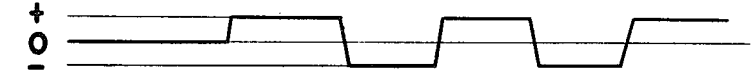
Figure 10:
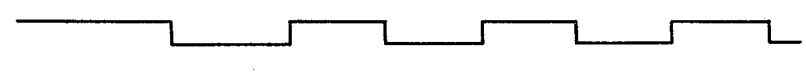
Figure 10:
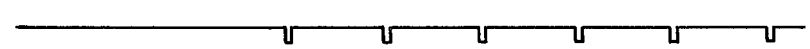
Figure 10:
Figure 10:
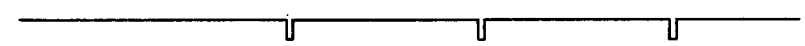
Figure 10:
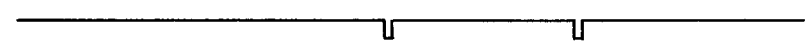
Figure 10:

FIG. 10.(d) $\overset{+}{\underset{-}{0}}$

AUTOMATIC INFORMATION RETRIEVAL DEVICE

The present invention relates to an automatic information retrieval device, and more particularly to an automatic retrieval device for film containing information thereon.

In general, automatic retrieval devices for information-containing film are so arranged that a predetermined frame out of a plurality of information-containing frames of a film is automatically brought into sight within an observation slot or peep opening for retrieval of the information therethrough.

Conventionally, in the automatic retrieval devices of the above described type, there have been various disadvantages in that, when the film stored on a supply reel is transferred onto a take-up reel, the ends of the film tend to come off the corresponding reels upon overwinding onto the take-up reel or excessive rewinding back onto the spply reel, thus requiring extremely troublesome procedures for winding the particular end back onto the corresponding reel, and that if such ends of the film are secured to the reels, there are cases where the film is damaged or broken due to such over-winding or excessive rewinding of the same.

Meanwhile, when such conventional automatic retrieval devices are associated with electronic computers as in an on-line system for reading out information from the desired frame of the film brought into sight in the peep opening through instructions by the computers, operations for the reading out will be greatly confused, as compared with retrieval by men through observation of the peep opening, if the ends of the film come off the reels as described above.

For the prevention of the disengagement of the film from the reels due to the over-winding or excessive rewinding, there has conventionally been proposed a retrieval device wherein the feeding of the film is suspended through detection of particular tapes or the like affixed to the end portions of the film, which arrangement, however, requires not only provision of an extra tape detector, but also additional work for sticking such tapes to the film or marking the film with exclusive marks, thus resulting a high manufacturing cost for the film.

Furthermore, in such conventional automatic retrieval devices, the film is forwarded by drive means such as motors, between the supply reel and the take-up reel, to such a position that the desired information frame thereof appears in the peep opening, with subsequent manual fine adjustment to bring the particular frame exactly within the peep opening. However, when the retrieval devices are connected, as described earlier, to electronic computers in the manner as in an on-line system, it is absolutely necessary to automatically effect selection of the desired frame and stopping of the same at the predetermined position at high speeds and accuracy. Such selection and stopping of the desired frame are conventionally carried out through independent motors associated with the supply reel and take-up reel respectively for selective clockwise and counterclockwise rotations. In other words, depending on the direction of advance of the film, either one of the motors is rotated, with the film being moved at sufficiently slow speed somewhat prior to the particular frame to be stopped, while, at the position at which the particular frame is to be stopped, the connection between the reel and the motor is broken by means of a clutch, or a shaft for the reel is forcibly braked for stopping the particular frame at the predetermined position. The above arrangement, however, has such disadvantages that backlash of gears provided between the main motor and the driving shaft of the reel adversely affects the accuracy of stopping of the film, thus making it difficult to correctly stop the particular frame at the predetermined position, and that the clutch or brake employed is not only unsuitable for high speed response, but requires an exclusive circuit for driving the same, with resultant complication of the mechanism of the retrieval device.

Another problem involved in the conventional retrieval devices of the above described type is that, since the film employed therein is provided only with blipmarks for counting the predetermined number of information frames and the number of information frames being fed, it is difficult to check whether the number of frames of the film being fed is in close agreement with the counted value, especially when the desired frame is to be projected, during stoppage of film feeding, upon coincidence of the counted value with the value set in a setting device, through counting, by a detector, of the number of blip-marks of the film being fed, with the number of frames to reach the desired frame having been preliminarily set in the setting device for automatization of the information retrieval.

Accordingly, an essential object of the present invention is to provide an automatic information retrieval device employing information-containing film in which overwinding or excessive re-winding of the film from one reel to the other is positively prevented with substantial elimination of the disadvantages inherent in the conventional information retrieval devices.

Another important object of the present invention is to provide an automatic information retrieval device of the above described type in which a servo-system is incorporated for rapidly selecting a desired information containing frame of the film and causing the same to automatically stop at a predetermined position correctly.

A further object of the present invention is to provide an automatic information retrieval device of the above described type in which a specially marked film is employed for making it possible to check the number of frames being fed as well as to positively prevent the over-winding and excessive rewinding of the film.

A still further object of the present invention is to provide an automatic information retrieval device of the above described type which is accurate in functioning and simple in construction, with consequent low manufacturing cost.

According to a preferred embodiment of the present invention, the automatic information retrieval device is provided with a servo-system for driving one of the film reels by a servo-controlled motor and the other of the film reels by a one directional constant torque motor so as to apply proper tension to the film between the reels, by which arrangement, a desired information frame of the film is rapidly selected, with the film being caused to automatically stop correctly at a predetermined position. Furthermore, the retrieval device of the invention employs an information retrieval film having a portion adjacent to its leading end which is unexposed opaque or blackened, with dummy marks being formed at the trailing end portion of the film, while parity check marks are disposed at every other information carrying frames of the film, whereby not only is the over-winding or excessive rewinding of the film positively prevented, but an efficient check of the number of frames fed is advantageously effected.

Figure 1:
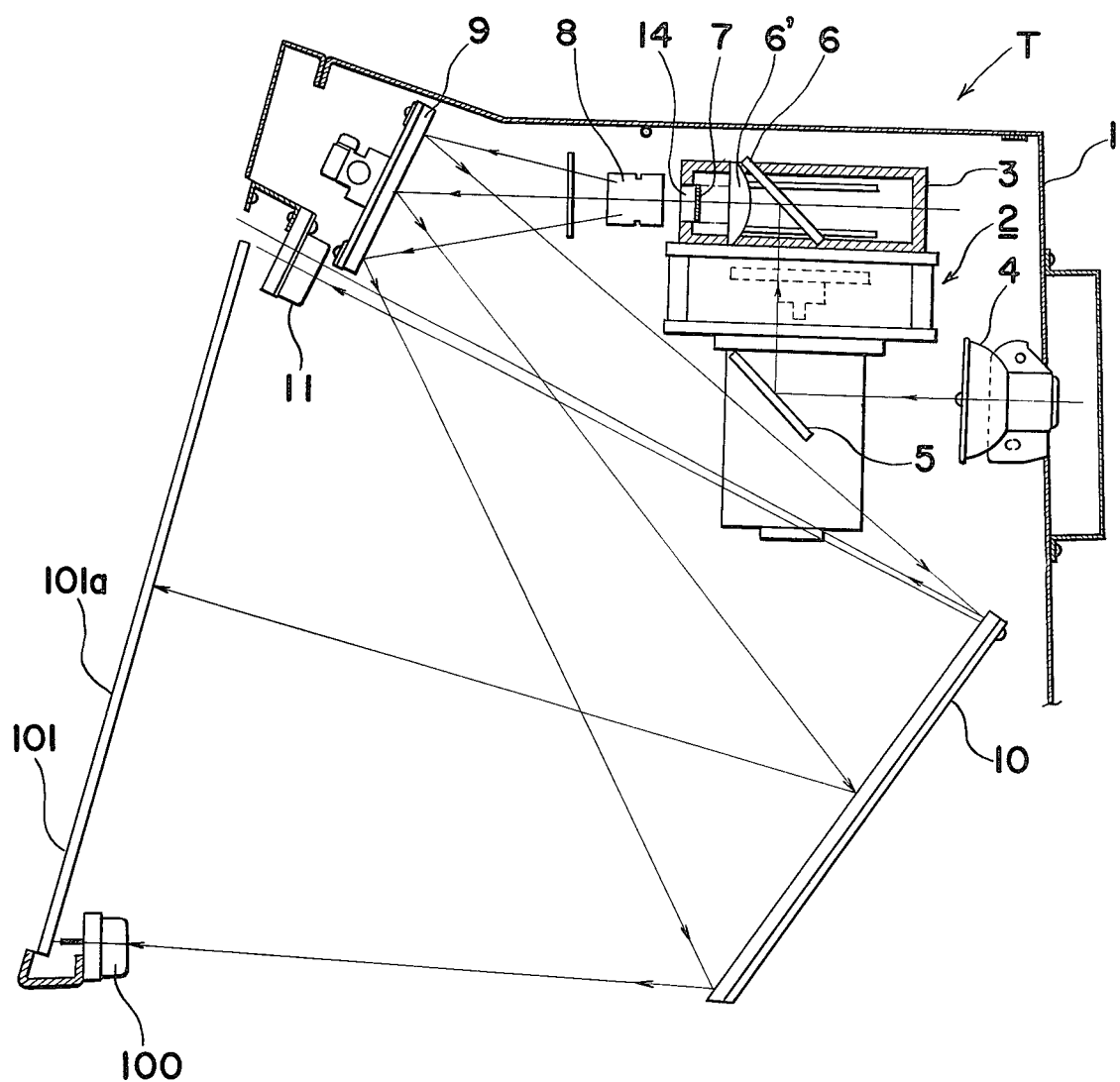
Figure 2:
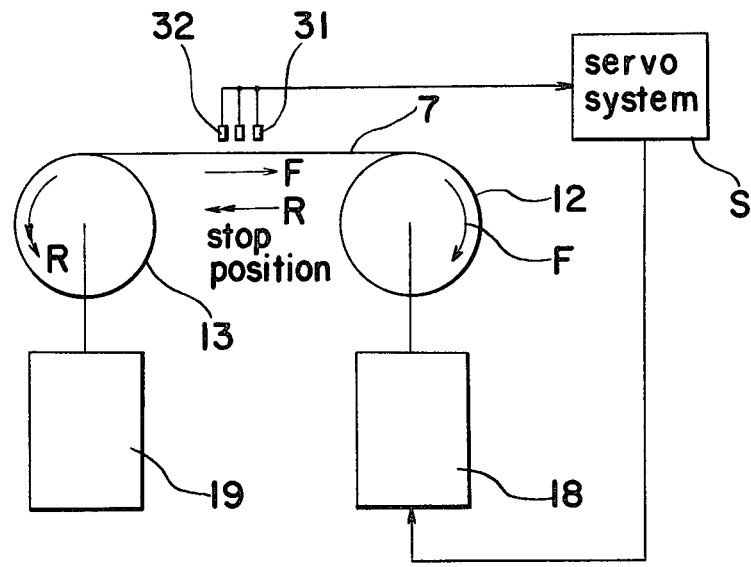
Figure 3:
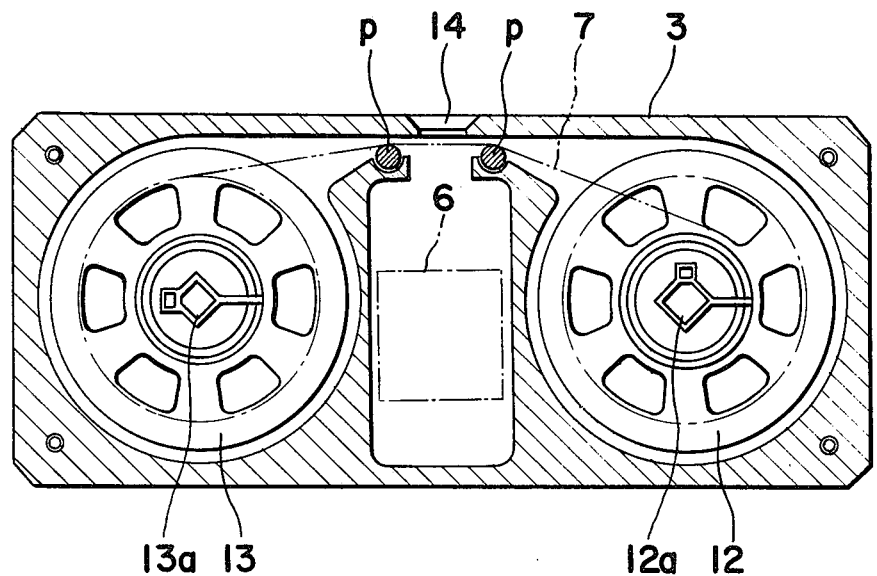
Figure 4:
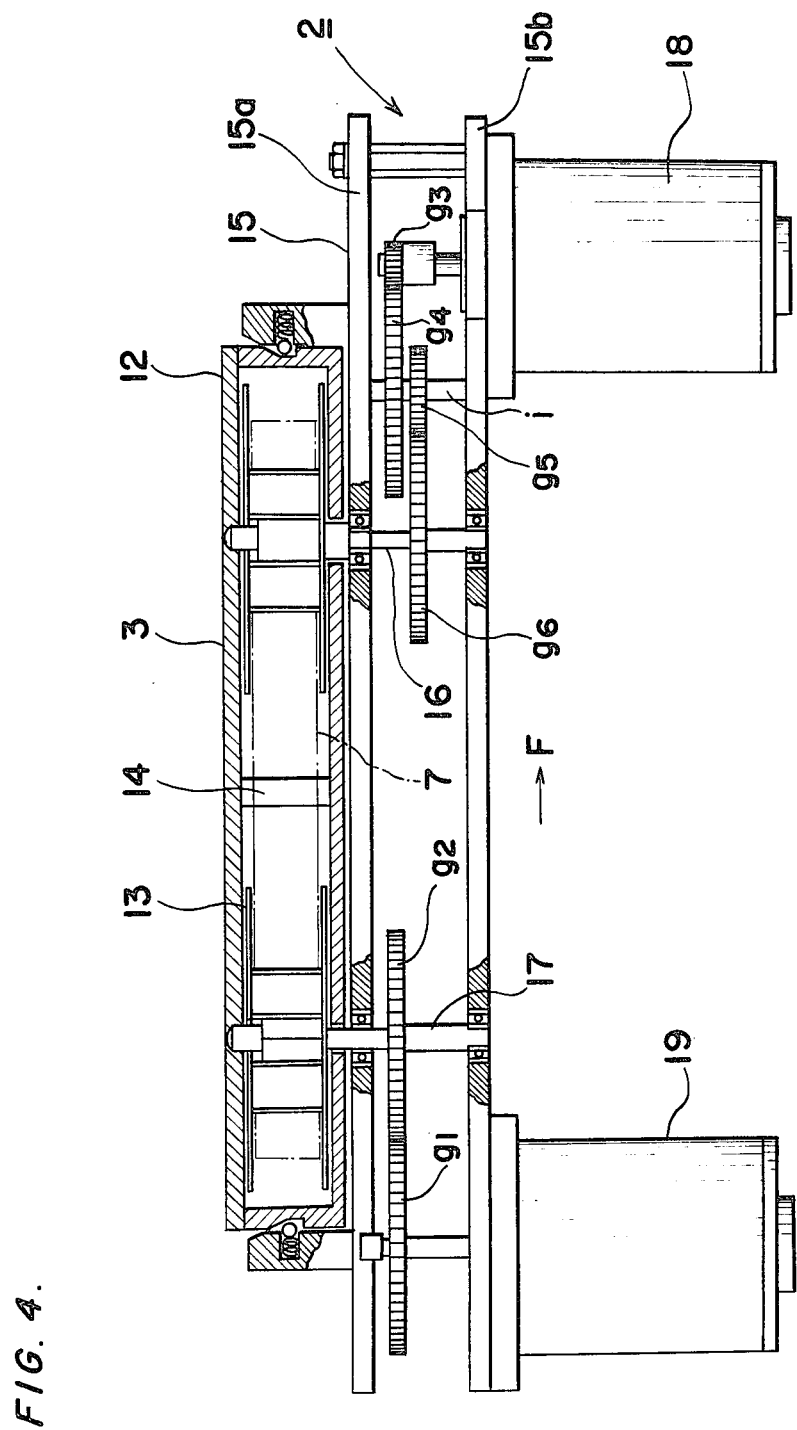
Figure 5:
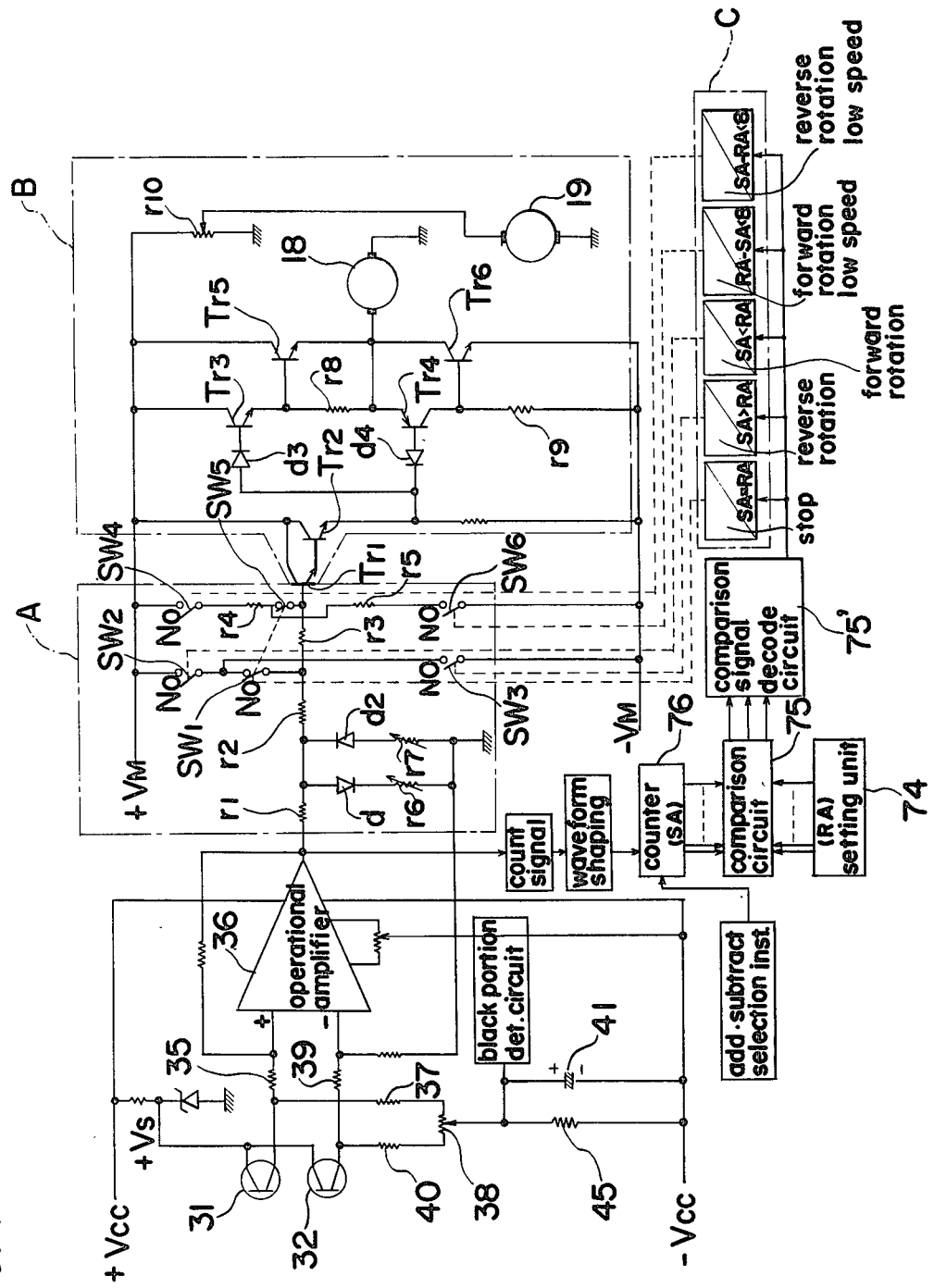
Figure 7:
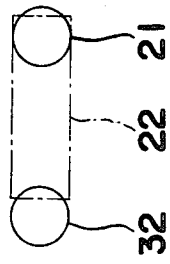
Figure 6:
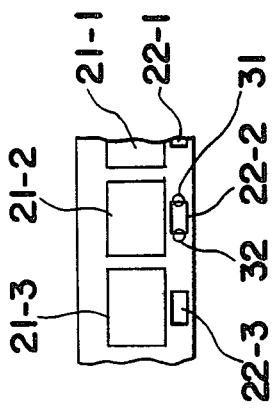
Figure 8:
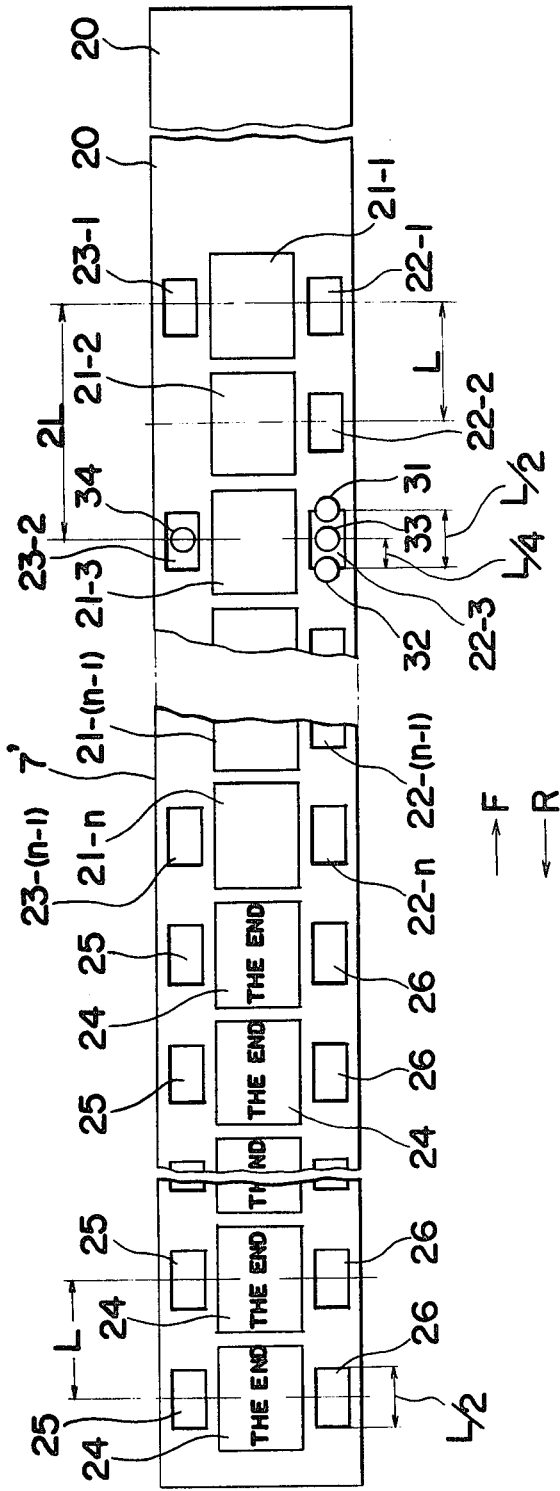
Figure 9:
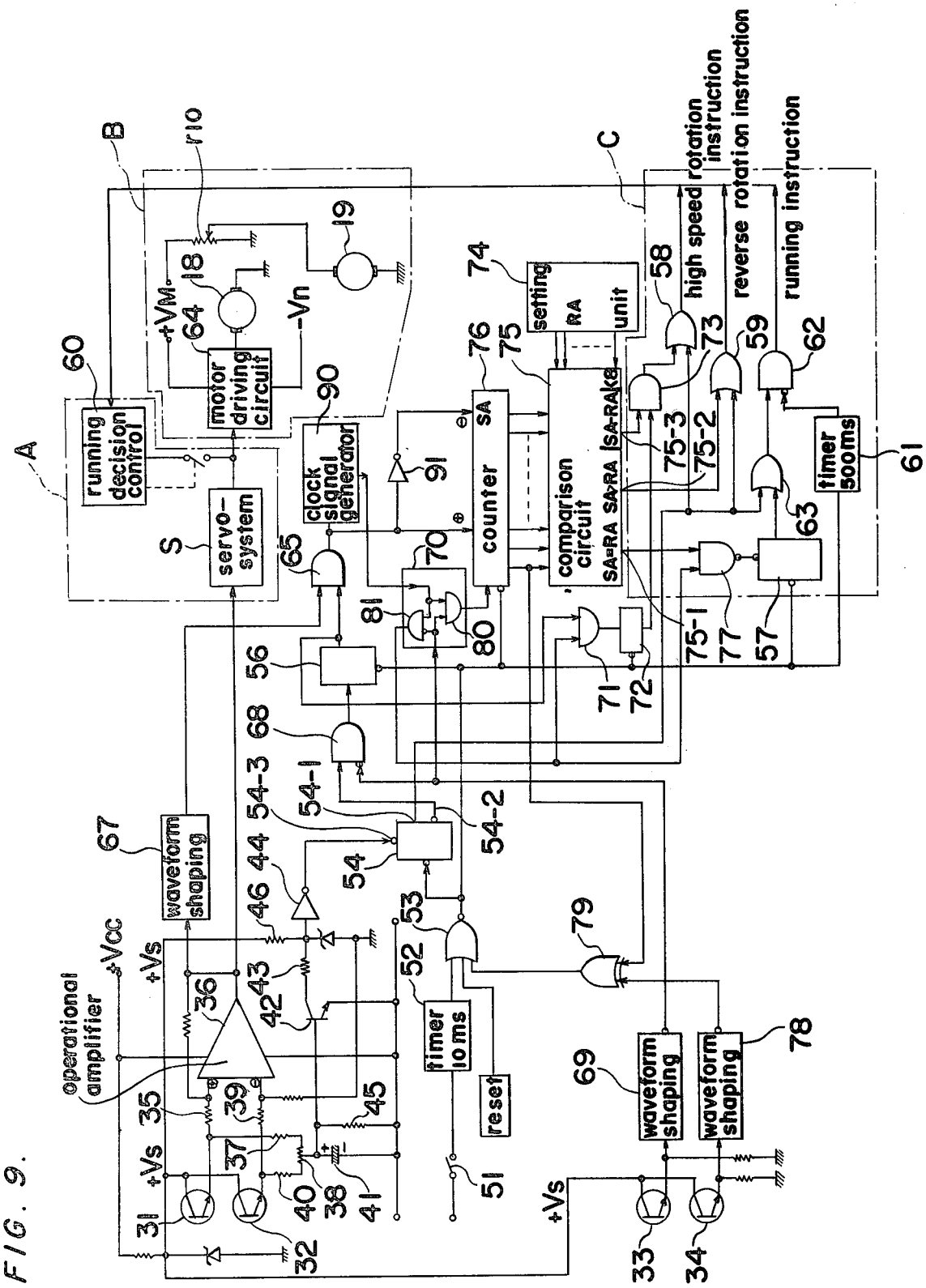

These and other objects and features of the present invention will become apparent from the following description of the preferred embodiment thereof with reference to the attached drawings, in which;

FIG. 1 is a side elevational view, partly in section, of an automatic information retrieval device of the invention, FIG. 2 is a schematic diagram for explaining the functioning of the retrieval device of FIG. 1, FIG. 3 is a top plan view, on an enlarged scale and partly in section, of a film cartridge employed in the device of FIG. 1, FIG. 4 is a side elevational view, on an enlarged scale and partly in section, of a film feeding section employed in the device of FIG. 1, with the film cartridge mounted thereon, FIG. 5 is a schematic electrical circuit diagram showing connections of various elements employed in the device of FIG. 1, FIG. 6 is a fragmental view, on an enlarged scale, showing the construction of an information film employed in the device of FIG. 1, FIG. 7 is a schematic diagram showing, on an enlarged scale, the relation between a blip-mark formed on the film of FIG. 6 and photosensors incorporated in the device of FIG. 1, FIG. 8 is a similar view to FIG. 6, but particularly shows a modification thereof, FIG. 9 is a similar diagram of FIG. 5, but particularly shows a modification thereof in which the information film of FIG. 8 is employed, and FIGS. 10a-10j are waveforms of signals at various points of the circuit of FIG. 9.

Before the description of the present invention proceeds, it is to be noted that like parts are designated by like reference numerals throughout several views of the attached drawings.

Referring to FIG. 1, there is shown an important portion of the automatic information retrieval device T of the invention. Incorporated in a housing 1 of the retrieval device T are a film feeding section 2, a cartridge or cassette 3 containing therein an information film 7 which is wound on reels described later, and detachably mounted on the feeding section 2, a light source 4 secured on one of the side walls of the housing 1 in a position below and adjacent to the feeding section 2 for projecting light rays, through mirrors 5 and 6 suitably inclined and a lens 6', onto the film 7, a lens 8 disposed in front of an opening or slit 14 of the cartridge 3 for further directing image light from the film 7 onto a screen 101i a of an indication window 101 through another set of suitably inclined mirrors 9 and 10, and sensor groups 11 and 100 (described later) disposed at the lower portion of the mirror 9 and the screen 101a respectively for receiving light through light transmitting portions formed on the film 7, such as blip-marks for positional control and counting and also for phase control, and light transmitting parity check marks which will be described later.

Referring to FIG. 2, there is schematically shown the functioning of a servo system S incorporated in the retrieval device of the invention. A film 7 having therein a plurality of developed information frames described later is connected at the ends thereof to a supply reel 13 and a take-up reel 12 for being transported therebetween, while a tension motor 19 is coupled to a shaft engaging the reel 13, with a shaft engaging the reel 12 being coupled to a main motor 18. The tension motor 19 is adapted to be driven in one direction shown by an arrow R at a constant torque, and the main motor 5 is controlled by a servo circuit S. The portion of the film 7 extending between the reels 13 and 12 faces photosensing elements 31 and 32 described later for detecting the presence of a required information frame in a predetermined position, with the elements 31 and 32 being coupled to the servo-system S.

Referring also to FIGS. 3 and 4, more specifically, the supply reels 13 and the take-up reel 12 having square socket portions 13a and 12a at the central portions thereof respectively are rotatably contained in the cartridge 3 of generally rectangular box-like configuration, which socket portions 13a and 12a are adapted for non-slip engagement with correspondingly shaped portions of the shafts 17 and 16 rotatably supported by upper and lower plates 15a and 15b of a deck 15 of the feeding portion 2. The film 7 wound on the reels 13 and 12 with the ends thereof secured to the latter is adapted to be transferred from the reel 13 to the reel 12 or vice versa, with the portion of said film 7 between The reels 13 and 12 facing the slit or opening 14 which is formed at the central portion of one long side wall of the cartridge 3 for projection of the light image of the information containing frame therethrough. A pair of spaced pins $p$ are rotatably supported by and within the cartridge 3 in positions adjacent to opposite sides of the opening 14 for guiding the portion of the film 7 in parallel and spaced relation to the opening 14. The shaft 17 for the supply reel 13 is driven by the tension motor 19 through gears $g1$ and $g2$ engaging each other and secured to a shaft of the motor 19 and the shaft 17 respectively, while the shaft 16 for the take-up reel 12 is rotated by the main motor 18 through gears $g3$ secured to a shaft of the motor 18, gears $g4$ and $g5$ fixed to an intermediate shaft $i$ rotatably supported by the plates 15a and 15b of the deck 15 and a gear $g6$ fixed to the shaft 16, the gears $g3$ to $g5$ being in mesh with one another.

It should be noted that the gear ratio in the above gear trains is so arranged that the number of rotations of the take-up reel 12 during high speed rotation of the main motor 18 is smaller than the number of rotation of the supply reel 13.

Referring now to FIGS. 5 to 7, the circuit of FIG. 5 incorporating therein the servo-system for controlling the main motor 18 includes an operational amplifier 36 the positive input terminal of which is connected to the emitter of a photosensing element or a photosensor 31 through a resistor 35 and the negative input terminal of which is connected to the emitter of a photosensor 32 through a resistor 39, with an output terminal of the amplifier 36 being connected to the base of a transistor $Tr1$ through series-connected resistors $r1$, $r2$ and $r3$, and also to parallel-connected variable resistors $r6$ and $r7$ through the resistor $r1$ and diodes $d1$ and $d2$. It is to be noted here that, as is shown in FIG. 6, the photosensors 31 and 32 are disposed in spaced relation to each other at such an interval that the light receiving centers thereof simultaneously face opposite sides of each of the rectangular light transmitting blip-marks 22 (described more in detail later) formed in the film 7 immediately below vertical center lines of information frames 21-1, 21-2, ... 21-$(n-1)$ and 21-$n$ of the film 7. The collectors of the photosensors 31 and 32 are connected to power source $+Vs$ and $+Vcc$ through a resistor, and also to ground through a diode, while the emitters of the photosensors 31 and 32 are connected to opposite ends of a variable resistor 38 through resistors 37 and 40 respectively. The slider terminal of the variable resistor 38 is coupled to a black portion detection circuit described later and also to ground or −Vcc through a resistor 45 and a capacitor 41. The output terminal of the operational amplifier 36 is also coupled to a counter 76 for counting the blip-marks passing the photosensors 31 and 32, through count signal and waveform shaping circuits, to which counter 76 an addition and subtraction selection instruction circuit is also coupled. The counter 76 is further coupled to a comparison circuit 75 which is in turn connected to a comparison signal decode circuit 75' for developing instruction signals to cause the main motor 18 to stop, to rotate in the forward direction (clockwise in FIG. 2), to rotate in the reverse direction (counterclockwise in FIG. 2) or to rotate at low speed. A setting unit 74 for setting the number of desired information frames of the film 7 is also coupled to the comparison circuit 75.

The base of the transistor Tr1 is also connected to a power source having voltage +VM, through the resistor r3, a switch SW1 which is turned off when stopping signal (SA = RA) becomes "1" by an output from the comparison signal decode circuit 75', and a switch SW2 which is turned on when forward rotation signal (SA < RA) becomes "1," and is further connected to the power source having voltage +VM through the switch SW1 and a switch SW3 which is turned on when reverse rotation signal (SA > RA) becomes "1." The base of the transistor Tr1 is still further connected to the power source +VM through a switch SW5 which is turned off when the stopping signal (SA = RA) becomes "1" by the output of the decode circuit 75' and a switch SW4 which is turned on when the forward rotation low speed signal (RA − SA < 8) becomes "1," and is also connected to the power source −VM through the switch SW5 and a switch SW6 which is turned on when reverse rotation low speed signal (SA − RA < 8) becomes "1." The emitter of a transistor Tr2 which is coupled to the transistor Tr1 to form an emitter-follower circuit through a darlington connection is connected to the base of a transistor Tr3 through a diode d3, and also to the base of a transistor Tr4 through a diode d4. The collector of the transistor Tr3 is connected to the power source +VM, while the emitter of the same is connected to the base of a transistor Tr5, and also to the emitter of the transistor Tr4, the main motor 18, the emitter of the transistor Tr5 and the collector of a transistor Tr6, through a resistor r8. The base of a transistor Tr6 is connected to the collector of the transistor Tr4, and also to the power source −VM through a resistor r9, with the emitter of the same transistor Tr6 also being connected to the power source −VM.

The tension motor 19 is connected between the power souce +VM and through a variable resistor r10 for rotation at constant torque in one direction at all times.

By the above arrangement, upon turning on a main switch (not shown), a constant negative voltage is impressed on the tension motor 19 through the variable resistor r10, with torque in the direction R (FIG. 2) for rewinding being applied to the supply reel 13. It should be noted here that the torque in the direction R for the reel 13 is set to be smaller than torque driving the take-up reel 12. When the number of the desired frame of the film 7, i.e., the set value RA of the setting unit 74 is larger, by more than eight, than the number of the information containing frame facing the opening 14 of the cartridge, i.e., the value SA contained in the counter 76, the comparison circuit 75 decides SA < RA and [SA − RA] > 8, and the comparison signal decode circuit 75' develops a forward rotation instruction which closes the switch SW2, with the base of the transistor Tr1 being supplied with the voltage +VM, while voltage approximately equal to the voltage +VM is developed also in the emitter of the transistor Tr2, which voltage, in turn, causes voltage approximately equal to +VM to be developed in the emitters of the transistors Tr3 and Tr5, with voltage roughly equal to +VM being impressed on the main motor 18 for causing said motor 18 to rotate in the forward direction at high speed. The take-up reel 12 thus turns in the forward direction of an arrow F (FIGS. 2 and 3) overcoming the constant tension torque applied in the direction R (FIG. 2), with consequent movement of the film 7 in the direction F.

It is to be noted here that, since the torque in the direction R is being applied to the supply reel 13, the film 7 is transported under constant tension onto the take-up reel 12 at high speed.

Following the rapid movement of the film 7 in the manner as described above, the operational amplifier 36 develops counting pulses which advances the counter 76. When the difference between the set number of the frame and the number of the information frames transported becomes smaller than eight, the comparison signal decode circuit 75' develops the signal for a forward rotation at low speed, which turns the switch SW6 on, with consequent decrease of the base voltage of the transistor Tr1 and the voltage to be applied to the main motor 18, thus causing the film 7 to run at low speed.

When the desired information containing frame has reached the opening 14, the contents of the counter 76 coincide with those of the setting unit 74, with detection of SA= RA by the comparison circuit 75 and development of the stop signal from the comparison signal decode circuit 75', thus turning off the switches SW1 and SW5 and consequently causing the motor 18 to stop.

In cases where the desired information containing frame of the film 7 moves past the opening 14 due to the inertia of the motor 18 and stops in such a position that the photosensor 31 receives more light through the blip-mark 22 than the photosensor 32, output voltage VB of the photosensor 31 becomes higher than output voltage VA of the photosensor 32, and the operational amplifier 56 applies a negative low voltage proportional to [VB − VA] to the transistor Tr1, with negative voltage being developed in the emitter of the transistor Tr2 and with negative low voltage also being developed in the emitter of the transistor Tr4, thus the main motor 18 being supplied with negative low voltage proportional to VB − VA for rotation in the reverse direction at low speed to rewind the film 7. When the photosensor 32 receives more light through the blip-mark 22 by the above described reverse rotation, the output from the operational amplifier 36 becomes a positive low voltage, with the transistors Tr2, Tr3 and Tr5 also developing outputs of positive low voltage, and thus the main motor 18 rotates in the forward direction at low speed to move the film 7 also in the forward direction to a certain extent.

It is to be noted that, by the adjustments of the variable resistors r6 and r7, more positive-side voltage than negative-side voltage in the output voltage from the operational amplifier 36 can be applied to the base of the transistor Tr1 for allowing the torque in the forward direction of the main motor 18 to overcome the torque of the tension motor 19.

The film 7 is thus adapted to move in the forward direction by torque equivalent to the difference of the torque of the main motor 18 and the tension motor 19, in which case, the amount of excessive feeding in the forward direction a second time is made smaller than that of the first time by the torque of the tension motor 19.

In the above described manner, the film 7 oscillating or moving alternately in the forward and reverse directions approaches the predetermined correct stopping position, with the amplitude of such oscillation being rapidly decreased, through which forward and reverse feedings at low speed, the voltage to be applied to the main motor 18 beomes zero in such a position that the blip-mark 22 of the film 7 evenly faces both of the photosensors 31 and 32, with the desired information frame of the film 7 being stopped at a correct position where the same precisely coincides with the opening 14.

It is clear that during the above operation, the film 7 under tension is always maintained in a stretched state between the reels 13 and 12, since the tension motor 19 applies the constant torque to the reel 13.

As is clear from the above description, according to the arrangement of the invention of FIGS. 1 to 7, the film is always kept under tension during movement thereof between the reels, through driving of one of the reels by the servo controlled motor, with driving of the other of the reels by the motor having one directional constant torque, by which arrangement, retrieval and selection of the desired frame of the information film is automatically effected with safety and accuracy, through rapid and correct stopping of such desired frame at the predetermined position.

Furthermore, by the elimination of the slackening or sagging of the film between the reels, not only is the damage or flaw to the film prevented, but maintenance of the correct distance between the film and the magnifying or projection lens in the arrangement is particularly effective for keeping the projected image in sharp focus. Moreover, the lack of necessity for the provision of clutches, brakes and the like makes the entire construction of the retrieval device extremely simple, without any noises being developed due to the functioning of such clutches and brakes, thus eliminating unfavourable effects on the control device.

Referring to FIGS. 8 to 10, there is shown a modification of the automatic information retrieval device of FIGS. 1 to 7. In this modification, the film 7' to be employed includes an entirely light opaque black portion 20 formed at the portion of the film 7' adjacent to the leading end thereof, which portion 20 has a length equivalent to ten-odd to several tens of frames and is formed simply by not exposing said portion 20 to light during exposure of the film 7' for recording necessary information thereon.

A plurality of the information containing frames 21-1, 21-2, ... 21-$(n-1)$ and 21-$n$ (hereinbelow referred to as information frames) are arranged on the film 7' with regular intervals therebetween in the direction of advance of the film 7', the first information frame 21-1 of which immediately follows the end of the black portion 20. As is described in connection with the embodiment of FIGS. 1 to 7, the light transmitting blip-marks of rectangular shape 22-1, 22-2, ... 22-$(n-1)$ and 22-$n$ for counting purposes are each formed under the corresponding information frame 21, with the vertical center line of each of the blip-marks 22 being aligned with that of the corresponding information frame 21, while the length of each blip-mark 22 is adapted to be ½ of the pitch L of the adjacent information frames 21, although not particularly limited to such and may be suitably altered depending on the requirement. The film 7' is further provided with a plurality of light-transmitting parity check marks 23-1, 23-2, ..... 23-$(n-1)$ and 23-$n$ of similar rectangular shape to the blip-marks 22, which parity check marks 23 are formed at the upper portion of every other information frame 22 of the film 7', for example, at the upper portions of odd-numbered information frames in such a manner that the parity check mark 23-1 corresponds to the frame 21-1, the parity check mark 23-2 to the frame 21-3 and so forth, with the vertical center line of each of the parity check marks 23 being aligned with that of the corresponding information frame 21. Immediately after the last information frame 21N, a plurality of dummy mark frames 24 having letters, for example, "THE END" therein follow, such dummy mark frames 24 being ordinarily several tens in number and arranged in a similar manner to the information frames 21.

It is preferable that the dummy mark frame 24, and the marks 25 and 26 immediately follow the last information frame 21-$n$ at an interval equal to the pitch L for optimum detection. At the upper and lower portions of each of the dummy mark frames 24, light transmitting marks 25 and 26 of rectangular shape are formed respectively in similar fashion to the parity check mark 23 and the blip-mark 22 formed for the information frame 21, with the vertical central axes of the marks 25 and 26 coinciding with the central axis of the dummy mark frame 24. The frame 24, and the marks 25 and 26 should preferably be formed in the film 7' at a pitch L as shown in FIG. 8.

It should be noted here that the portions of the film 7' between the information frames 21, the blip-marks 22, the parity check marks 23, the dummy mark frames 24, the marks 25 and between the marks 26 are opaque, i.e. non-light transmitting.

The above described film 7' is housed in the cartridge 3 (FIG. 3) exactly in the same manner as the film 7 of the first embodiment, which cartridge 3 is detachably received by the rotatable shafts 17 and 16 of the deck 15 of the feeding portion 2.

It should be noted here that the constructions of the cartridge 3 and the feeding portion 2 are exactly the same as those in FIGS. 3 and 4 except for the arrangement in the film 7' and minor alterations in the circuit construction described later, so that a detailed description of such cartridge and feeding portion is omitted for brevity.

Reference is made also to FIG. 9 showing a block diagram of a control circuit for the retrieval device employing the film 7' of FIG. 8.

It is to be noted here that the circuit of FIG. 9 is fundamentally the same as the circuit of FIG. 5, with the portions A, B and C enclosed by chain lines in FIG. 5 corresponding to the portions A, B and C similarly surrounded by chain lines in FIG. 9, the portions A, B and C of the former showing detailed construction of the portions A, B and C of the latter, and that in the circuit of FIG. 9, another photosensor 33 is disposed between the photosensors 32 and 31 for blip-mark detection, while still another photosensor 34 is employed for detecting light transmitted through the parity check marks 23 in a manner described below.

In FIG. 9, the photosensors 31, 32, 33 are so disposed that the same receive light passing through the counting blip-marks 22-1, 22-2, . . . 22 - (n−1) and 22-n, and the marks 26, with the distance between the vertical central lines of the neighboring photosensors 32 and 33 or 33 and 31 being adapted to be ¼ L (where L is the pitch or distance between the vertical central lines of neighboring frames 21) as shown in FIG. 8. Accordingly, when the vertical central line or the photosensor 33 is aligned with that of the corresponding blip-mark 22, the light receiving center of the photosensor 31 coincides with one side of the blip-mark 22 with respect to the direction of advance of the film 7' shown by the arrow F in FIG. 8 so that one half of the photosensor 31 at the right hand side is shielded against the light, while the other half of the same at the left hand side receives the light through the blip-mark 22, and similarly one half of the photosensor 32 at the right hand side receives the light through the blip-mark 22, with the other half of the same at the left hand side being shielded against any light.

The photosensor 34 is so disposed as to detect the light passing through the parity check marks 23-1, 23-2, . . . 23-(n-1) and 23-n as shown in FIG. 8.

It should be noted here that the positions of the photosensors 31, 32, 33 and 34 are not limited to those in FIG. 8, but such photosensors 31 to 34 may be disposed at any other positions so long as they function in the manner as described above.

Still referring to FIG. 9 and also to FIG. 10, the collector of each of the photosensors 31, 32, 33 and 34 is connected to the power source +VS, while the emitter of the photosensor 31 is connected to the positive input terminal of the operational amplifier 36 through the resistor 35, and also to one terminal of the variable resistor 38 through the resistor 37. The emitter of the photosensor 32 is connected to the negative input terminal of the operational amplifier 36 through a resistor 39, and also to the other terminal of the variable resistor 38 through the resistor 40 as earlier mentioned with reference to FIG. 5. The slider arm of the variable resistor 38 is coupled to the base of a transistor 42 having a grounded emitter, and also to ground through the resistor 45 and the capacitor 41. The collector of a transistor 42 is connected to an input terminal of an inverter 44 through a resistor 43, and also to power source +VS through a resistor 46.

By this arrangement, on the assumption that the output voltages of the photosensors 31, 32 and 33 are VA, VB and VC respectively and that the film 7' is moving to the right in FIG. 8, each of the photosensors 31, 32 and 33 develops maximum output when the same faces the light transmitting portion of the film 7', and develops minimum output upon facing the non-light transmitting portion thereof, so that the output VA of the photosensor 31 varies as shown in FIG. 10(a), while the outputs VB and VC of the photosensors 32 and 33 vary as shown in FIGS. 10(b) and 10(c) respectively, from which fact, voltage VB-VA as shown in FIG. 10(d) is developed at the output terminal of the operational amplifier 36. Accordingly, one pulse is developed at the output terminal of the operational amplifier 36 every time the blip-mark 22 for counting passes the photo-sensors 31 and 32, i.e., every time the information frame 21 passes the opening 14 of the retrieval device as shown in FIG. 10(e). When the black portion 20 of the film 7' faces both of the photosensors 31 and 32, the photosensors 31 and 32 are turned off, with the base voltage of the transistor 42 being reduced to −VCC (or to low level), thus the transistor 42 being rendered non-conducting, and accordingly, the input of the inverter 44 becomes "1, " with the output thereof being "0. " When either the photosensor 31 or the photosensor 32 is receiving the light, voltage is applied to the base of the transistor 42 through the resistor 37 or 40, the transistor 42 is conducting, with the output of the inverter 44 being "1."

Still referring to FIGS. 8 to 10, and also back to FIGS. 3 and 4, the construction and function of other portions of the circuit of FIG. 9 are described in detail hereinbelow together with a description of the functioning of the retrieval device of the invention employing the film 7' of FIG. 8.

When the cartridge 3 having therein the film 7' of FIG. 8 is mounted on the deck 15, with the socket portions 13a and 12a of the reels 13 and 12 receiving the corresponding shafts 17 and 16 of the deck 15, the film 7' is transported from the supply reel 13 to the take-up reel 12 upon energization of the main motor 18. On the assumption that one of the information frames 21 is in a position coincident with the opening 14 of the cartridge 3, both of the photosensors 31 and 32 are partially overlapped by the blip-mark 22, with the output of the inverter 44 being "1."

Upon turning on the power switch 51, a timer 52 is actuated, with the output thereof being kept at "1" for approximately 10 m sec., which output "1" is applied to a NOR gate 53 to develop an output of "0" therefrom, thus a flip-flop 54 being set to develop an output of "1" at its output terminal 54-1 and an output of "0" at its output terminal 54-2. Similarly, flip-flops 56 and 72, and a parallel output addition and subtraction counter 76 are also reset, with a flip-flop 57 being set. The output of the output terminal 54-1 of the flip-flop 54 is applied to OR gates 58, 59 and 63, and the OR gate 58 develops a high speed rotation instruction signal for the motor, while the OR gate 59 develops a reverse rotation instruction signal for the motor, which signals are impressed on a running decision control circuit 60. Meanwhile, the "0" signal from the NOR gate 53 is applied to a timer 61 the output of which, at this time, becomes "1, " and subsequently becomes "0" after approximately 500 m sec. for opening an inhibit gate 62. Since the signal "1" has already been supplied from the flip-flop 54 through the OR gate 63, the inhibit gate 62 develops a motor running instruction signal. By the above described three instruction signals, a motor driving circuit 64 applies high speed reverse rotation voltage to the motor 18, which is then rotated at high speed in the reverse direction, with simultaneous reverse rotation of the reels 13 and 12, thus the film 7' being transported in the direction shown by the arrow R in FIG. 8.

It should be noted here that the constant voltage +VM is applied to the motor 19 through the variable resistor r10 so as to impart proper tension to the film 7'.

During high speed transportation of the film 7' between the reels 13 and 12, every time the counting blip-marks 22 of the film 7' pass the photosensors 31 and 32, the operational amplifier 36 develops pulses in the manner as described earlier, in which case, since the output from the flip-flop 56 which is reset is "0," an AND circuit 65 is closed, with a clock signal generator 90 developing no output therefrom, so that the pulses from the operational amplifier 36 are not applied to an AND gate 80 and an inhibit gate 81 in a pulse selection circuit 70.

When the film 7' is rewound onto the supply reel 13, with the black portion 20 of the film 7' reaching the front portions of the photosensors 31 and 32, the same photo-sensors 31 and 32 are turned off, with the transistor 42 being rendered non-conducting and with the output of the inverter 44 becoming "0," which output "0" renders a reset input terminal 54-3 of the flip-flop 54 to be "0." Accordingly, the flip-flop 54 is reset, with the output of the output terminal 54-1 becoming "0" and with that of the output terminal 54-2 becoming "1." When the output of the output terminal 54-1 of the flip-flop 54 becomes "0," the outputs of the OR gates 58 and 59 are caused to be "0," with consequent disappearance of the high speed rotation instruction signal and the reverse rotation instruction signal.

Since the black portion 20 of the film 7' has a length equivalent to ten-odd to several tens of the information frames 21, the portion of the film 7' adjacent to the leading edge thereof is still wound on the reel 12 when the black portion 20 of the film 7' first faces the photosensors 31 and 32. Meanwhile, the inhibit gate 62 is open, when the running instruction signal remaining to be developed by the output "1" on the flip-flop 57, so that the motor 18 is driven at a low speed in the forward direction F, while the film 7' is also transported in the forward direction to sequentially bring the information frames 21 into the opening 14 of the cartridge 3.

Upon further transportation of the film 7' to bring the blip-mark 22-1 to the photosensor 33, the output of the waveform shaping circuit 69 is rendered to be "0" as shown in FIG. 10(g), with consequent opening of an inhibit gate 68 and resetting of the flip-flop 56. The output from the flip-flop 56 causes the AND gate 65 to open, while the pulse developed at the photosensor 31 is shaped in a waveform to be impressed on the AND gate 65. When the output of the AND gate 65 is "1," and adding state is established through opening of an addition gate of the addition and substraction counter 76, while when the output of the AND gate 65 is "0," the output of the inverter 91 is rendered to be "0," with a substraction gate of the counter 76 open, thus substracting state being established. The AND gate 65, upon arrival of the blip-mark 22-1 at the photosensor 31, applies a clock signal as shown in FIG. 10(f) to the AND gate 80 and the inhibit gate 81 through the clock signal generator 90, which AND gate 80 and inhibit gate 81 are so controlled that when the photosensor 33 faces the blip-mark 22, the pulse applied by the AND gate 65 is formed into the clock signals as shown in FIG. 10(f) through the clock signal generator 90 so as to develop pulses as shown in FIG. 10(h) at the output terminal of the inhibit gate 81.

When the first information frame 21-1 of the film 7' confronts the opening 14 of the cartridge 3, a stop pulse developed by the inhibit gate 81 is applied to the AND gate 71, with the output of the same AND gate 71 being rendered to be "1." The output of the AND gate 71 is applied to the flip-flop 72, which is then reset and develops and output of "1," thus detection of the first information frame 21 being effected. The output of the flip-flop 72 is applied to an AND gate 73, in which case, if the set value of the setting unit 74 for setting the number of the desired information frame 21 is (0), the output of the setting unit 74 is applied to the comparison circuit 75 for comparison with the contents of the counter 76, with the comparison circuit 75 developing an output at an output terminal 75-1 thereof, which output causes an output of an a NAND gate 77 to be "0." The flip-flop 57 is thus reset, developing an output of "0," with consequent disappearance of the running instruction signal and causing the motor 18 to stop, in which state, the first information frame 21-1 of the film 7' confronts the opening 14 of the cartridge 3 and the image of the same frame 21-1 is displayed on the screen 101a of the indication window 101 of the retrieval device T (FIG. 1).

When the desired number RA of the information frame 21 is set in the setting unit 74, with the power source turned on, signals equivalent to the set number are applied to the comparison circuit 75.

On the other hand, if the rewound film 7' remains stationary at the first information frame 21-1, the contents SA of the addition and subtraction counter 76 are zero. If the difference between the position of the film 7', i.e., the number of the information frame 21 facing the opening 14 and the set value of the setting unit 74 is eight or over, the output of an output terminal 75-3 of the comparison circuit 75 is "1," with the output of an output terminal 75-2 of the same circuit 75 being "0." The "1" signal is applied to the OR gate 58 through the AND circuit 73 for developing the high speed rotation signal for causing the motor 18 to rotate in the forward direction at high speed, with simultaneous transportation of the film 7' in the direction F of FIG. 8.

During feeding of the film 7' in the direction shown by the arrow F in FIG. 8, the operational amplifier 36 develops pulses every time the counting blip-marks 22-1, 22-2, . . . 22-($n-1$) and 22-$n$ pass the front portions of the photosensors 31 and 32, which pulses of the amplifier 36 cause count pulses shown in FIG. 10(i) to be applied to the addition subtraction counter 76 through a waveform shaping circuit 67, the AND circuit 65, the clock signal generator 90 and the AND gate 80. It is to be noted that, during the forward feeding of the film 7', addition instruction signals (+) are applied to the counter 76, with the contents of the counter 76 increasing.

When the difference between the contents of the counter 76 and the set value of the setting unit 74 becomes less than eight, the output of the output terminal 75-3 of the comparison circuit 75 is rendered to be "0," which in turn causes the output of the OR gate 58 to be "0," with disappearance of the high speed rotation instruction signals, for rotating the motor 18 in the forward direction at low speed and also for feeding the film 7' at low speed.

Upon further advancing of the film 7' to bring the contents of the counter 76 into agreement with the set value of the setting unit 74, the output of the output terminal 75-1 of the comparison circuit 75 becomes "1," which output "1" of the terminal 75-1 and the stop pulse developed by the inhibit gate 81 at the stopping position cause the output of the NAND gate 77 to be "0" to reset the flip-flop 57. The output of the flip-flop 57 thus becomes "0," with consequent disappearance of the running instruction signal and stopping of the motor 18 and the film 7', by which procedure, the information frame having the desired number is selected.

If the set value of the setting unit 74 is smaller than the value memorized in the counter 76, i.e., the position of the information frame facing the opening 14, an output of "1" is developed at the output terminal 75-2 of the comparison circuit 75 for developing a reverse rotation instruction signal from the OR gate 59, thus causing the motor 18 to rotate in the reverse direction.

During the transportation of the film 7', every time the parity check marks 23-1, 23-2, ... 23-(n−1) and 23-n pass the front of the photosensor 34, output pulses as shown in FIG. 10(j) are generated at an output terminal of a waveform shaping circuit 78 of the photosensor 34. During the normal film feeding, the pulses of the photosensor 34 are developed when the odd number information frames 21 pass the opening 14 of the cartridge 3, which pulses from the photosensor 34 are shaped into rectangular waves by the waveform shaping circuit 78 for being applied to an OR else circuit 79. On the other hand, with the least significant bit output of the counter 76 being applied to the OR else circuit 79, signals developed at input terminals of the OR else circuit are both either "0" or "1" when the number of the information frame 21 passing the opening 14 coincides with the contents of the counter 76, so that the output of the OR else circuit is always "0." Should the number of the information frame 21 of the film 7' not be in agreement with the contents of the counter 76 due to some malfunction, however, disagreement in the signals of the input terminals of the OR else circuit 79 is brought about, which causes the output of the same OR else circuit 79 to be "1." of the OR else circuit 79 is applied to the NOR gate 53, the output of which is rendered to be "0," thereby the flip-flop 54 being set, to effect a similar function to that of film rewinding described earlier.

If the film 7' should be further wound beyond the information frame 21-n of a predetermined number, the photosensor 34 detects the marks 25 formed above the dummy mark frames 24 every time the dummy marks 24 pass, for imparting the signal "1" to the OR else circuit 79, so that the same OR else circuit 79 develops error detection signals in the same manner as in parity checking for stopping the transportation of the film 7'.

On the other hand, when the opening 14 of the retrieval device is continuously being observed by an operator, the termination of the film 7' is readily indicated by th dummy mark such as "THE END" through the opening 14, thus manual suspension of the film feeding also being possible.

As is clear from the foregoing description, according to the automatic information retrieval device of the invention, the film is adapted to stop accurately at the predetermined position for rapid selection of the desired information frames of the film, through employment of the servo system in which one of the film reels of the cartridge is driven by the servo-controlled motor, while the other of the reels is rotated by the one directional constant torque motor.

Furthermore, in the device of the invention, since an opaque portion is formed in the portion adjacent to the leading end of the film, while the dummy mark frames having therein indications such as "THE END" or the like are arranged in the trailing end portion of the film immediately following the information containing frames, with the parity check mark being formed adjacent to every other one of the even numbered or odd numbered information containing frames, the leading and trailing end portions of the film can readily be detected, and by arranging to suspend the rewinding of the film through detection of the opaque leading end portion by photosensing elements and the like, the film end is positively prevented from coming off the reel. Moreover, errors in the number of information frames being fed are also easily detected through detection of the parity check marks, thus correct operation of the retrieval device can be expected even when the same device is associated with electronic computers as in an online system.

It is another advantage of the retrieval device of the invention that the opaque portion formed adjacent the leading end of the information film is simply formed by leaving such portion unexposed during the production of the information film, thus making it easy to prepare the films. Moreover, since the photosensor for detecting the opaque portion is also utilized as the photosensor for detecting the blip-marks to count the number of the information frames of the film, the detection unit to be incorporated in the retrieval device is made simple in construction, with consequent low cost of the retrieval device.

Although the present invention has been fully described by way of example with reference to the attached drawings, it is to be noted that various changes and modifications will be apparent to those skilled in the art. Therefore, unless otherwise such changes and modifications depart from the scope of the present invention they should be construed as included therein.

What is claimed is:

1. An automatic information retrieval device for use with an information film having an opaque leading end porion, a plurality of information containing frames following said leading end portion, light transmitting blip marks in a position corresponding to each of said information containing frames, and a plurality of dummy frames at the trailing end portion following said information containing frames, the device comprising a light source and a projecting means operatively associated with said light source for projecting said information containing frame onto a screen, means for transporting said film past said light source and projecting means in a first direction for forwarding the film and in a second direction for reversing the film, means designating a desired frame number of said information containing frames which it is desired to project, a photosensing means positioned adjacent the path of the film for receiving light transmitted through said blip marks and generating a pulse signal at the passage of every blip mark, a counter to which said photosensing means is connected, a first means associated with said counter and said designating means and coupled to said transporting means for disabling said transporting means for stopping the film with the designated frame positioned relative to said light source and projecting means for projecting the designated frame onto said screen, a second means associated with said counter and coupled to said transporting means for disabling said transporting means upon detection of said leading end portion by said photosensing means as said film is transported in said second direction, and a third means associated with said counter means and coupled to said transporting means for disabling said transporting means when said dummy frames are projected onto said screen while the film is transported in said first direction.

2. An automatic information retrieval device for use with an information film having an opaque leading end portion, a plurality of information containing frames following said leading end portion, a first series of light transmitting blip marks, each of which is in a position corresponding to one of said information-containing frames, a first series of light transmitting parity check marks, each of which is in a position corresponding to every other one of said blip information-containing frames and on the opposite side of a frame from a corresponding blip mark, a plurality of dummy mark frames following said information-containing frames and defining a trailing end portion of the film, and a second series of light transmitting blip marks and parity check marks, each of which is in a position corresponding to one of said dummy mark frames and on opposite sides of the corresponding frame, the device comprising a light source and a projecting means operatively associated with said light source for projecting an image of said information-containing frames onto a screen, means for transporting said film past said light source and said projecting means in a first direction for forwarding the film and in a second direction for reversing the film, means designating a desired frame number of said information-containing frames, a first photosensing means positioned adjacent the path of said film for receiving light transmitted through said first and second series of blip marks and generating pulse signal at the passage of every blip mark, a second photosensing means positioned adjacent the path of said film for receiving light transmitted through said first and second series of parity check marks and generating a pulse signal at the passage of every parity check mark, a counter to which said first and second photosensing means are connected for counting said pulses, disabling means coupled to said transporting means for stopping the film, a miscount detecting means coupled with said counter and coupled to said disabling means for actuating said disabling means when lack of coincidence occurs between said blip marks of said first series of blip marks and the parity check marks of said first series of parity check marks, a trailing end detecting means coupled with said counter and coupled to said disabling means for actuating said disabling means when said counter receives pulses from said second series of parity check marks, and a leading end portion detecting means coupled with said counter and coupled to said disabling means for actuating said disabling means when no pulses are received from said photosensing means.

3. An automatic information retrieval device as claimed in claim 2 further including a third photosensing element positioned adjacent the path of said film at a point spaced from said first photosensing element equal to the length of said blip marks, and a fourth photosensing element disposed half-way between said first and third photosensing elements, said third and fourth photosensing elements being connected to said counters, so that when said fourth photosensing element is aligned, at its light receiving center, with a vertical central line of each of said blip-marks, the light receiving centers of said first and second light receiving elements are aligned with opposite ends of said blip mark, respectively, for subjecting the inner half of each of said first and second photosensing elements within said blip-mark to light through said blip-mark and for shielding the outer half of each of said first and second photosensing elements from light.

4. An automatic information retrieval device for use with an information film having an opaque leading end portion, a plurality of information containing frames following said leading end portion, a series of light transmitting blip marks, each of which is in a position corresponding to one of said information-containing frames, a series of light transmitting parity check marks, each of which is in a position corresponding to every other one of said blip information-containing frames and on the opposite side of a frame from a corresponding blip mark, the device comprising a light source and a projecting means operatively associated with said light source for projecting an image of said information-containing frames onto a screen, means for transporting said film past said light source and said projecting means in a first direction for forwarding the film and in a second direction for reversing the film, means designating a desired frame number of said information-containing frames, a first photosensing means positioned adjacent the path of said film for receiving light transmitted through said series of blip marks and generating pulse signals at the passage of every blip mark, a second photosensing means positioned positioned adjacent the path of said film for receiving light transmitted through said series of parity check marks and generating a pulse signal at the passage of every parity check mark, a counter to which said first and second photosensing means are connected for counting said pulses, disabling means coupled to said transporting means and to which said counter is connected and generating an output when a parity check mark pulse is not received by said counter for every other blip mark pulse received, and for stopping the film.

5. An automatic information retrieval device as claimed in claim 4 wherein said transporting means for said film includes a pair of rotatable reels onto which said film is wound for being transported therebetween, a servo controlled motor coupled to one of said reels for rotation thereof, and a further motor coupled to the other of said reels which rotates in one direction at constant torque so that tension is applied to said film during transportation of the film between said reels.

* * * * *